Nov. 28, 1967  W. C. FREY ETAL  3,354,765
AUTOMATIC CUTTING DEVICE
Filed Oct. 23, 1965  8 Sheets-Sheet 2
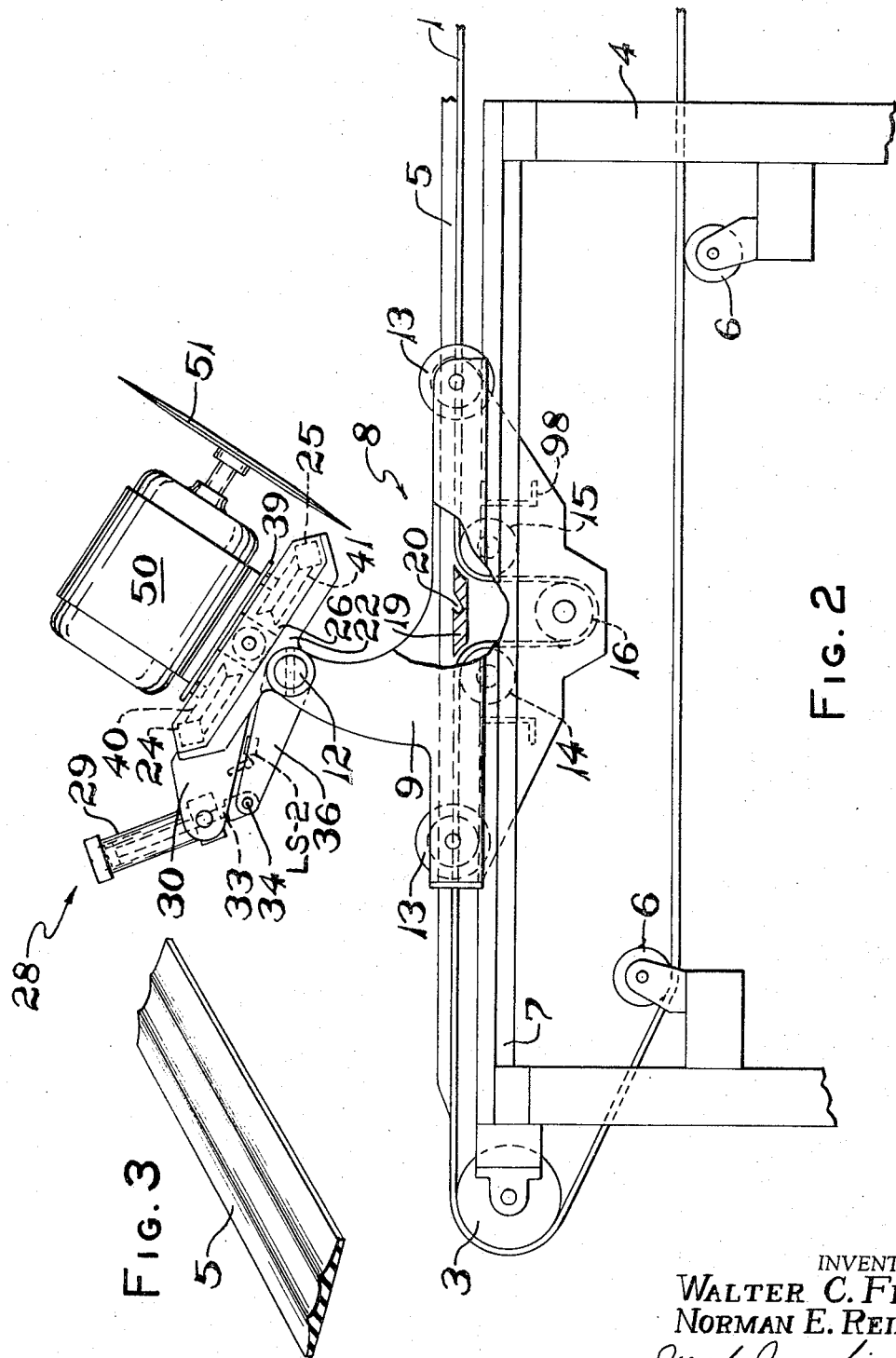
INVENTORS
WALTER C. FREY
NORMAN E. REINHART
ATTY.

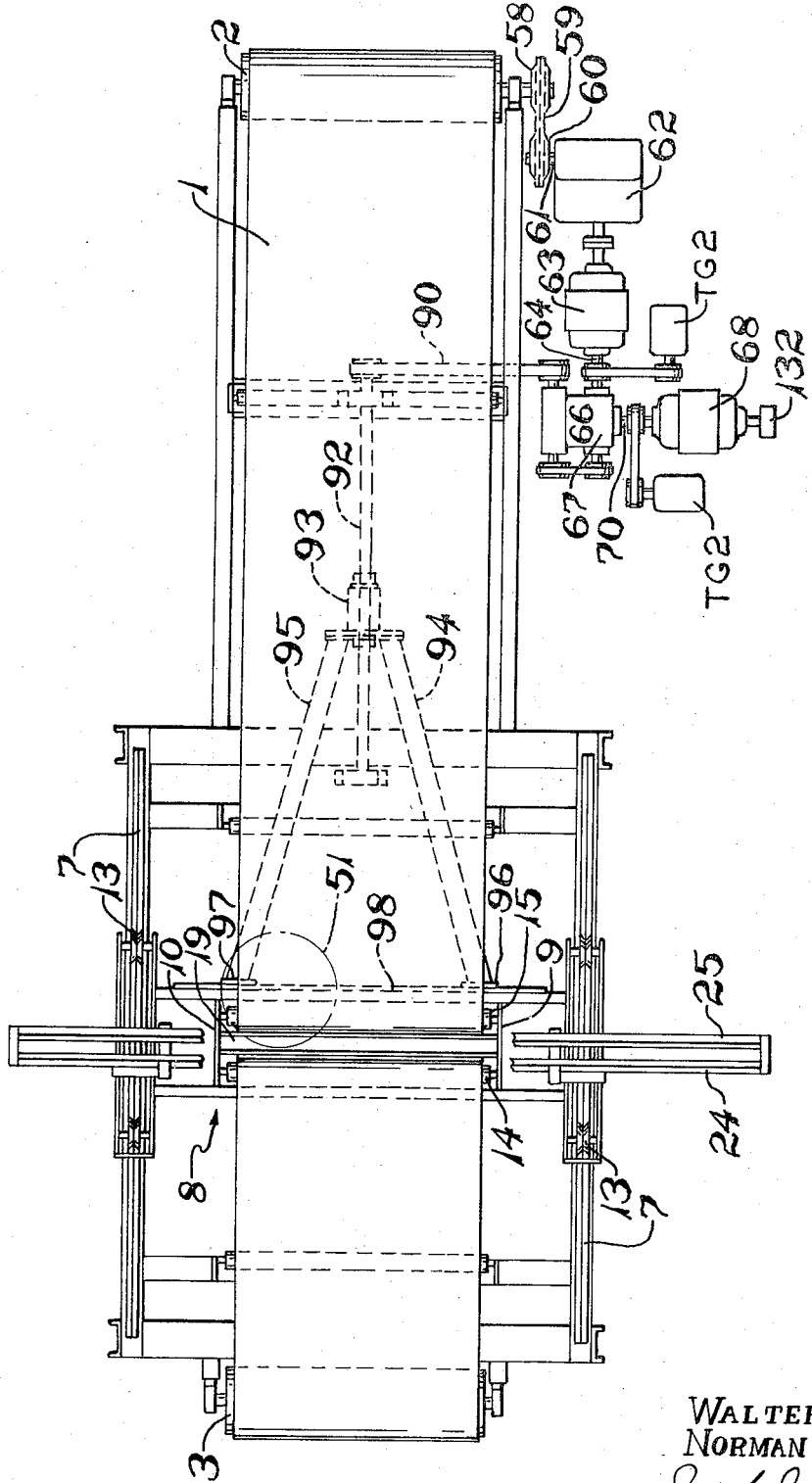

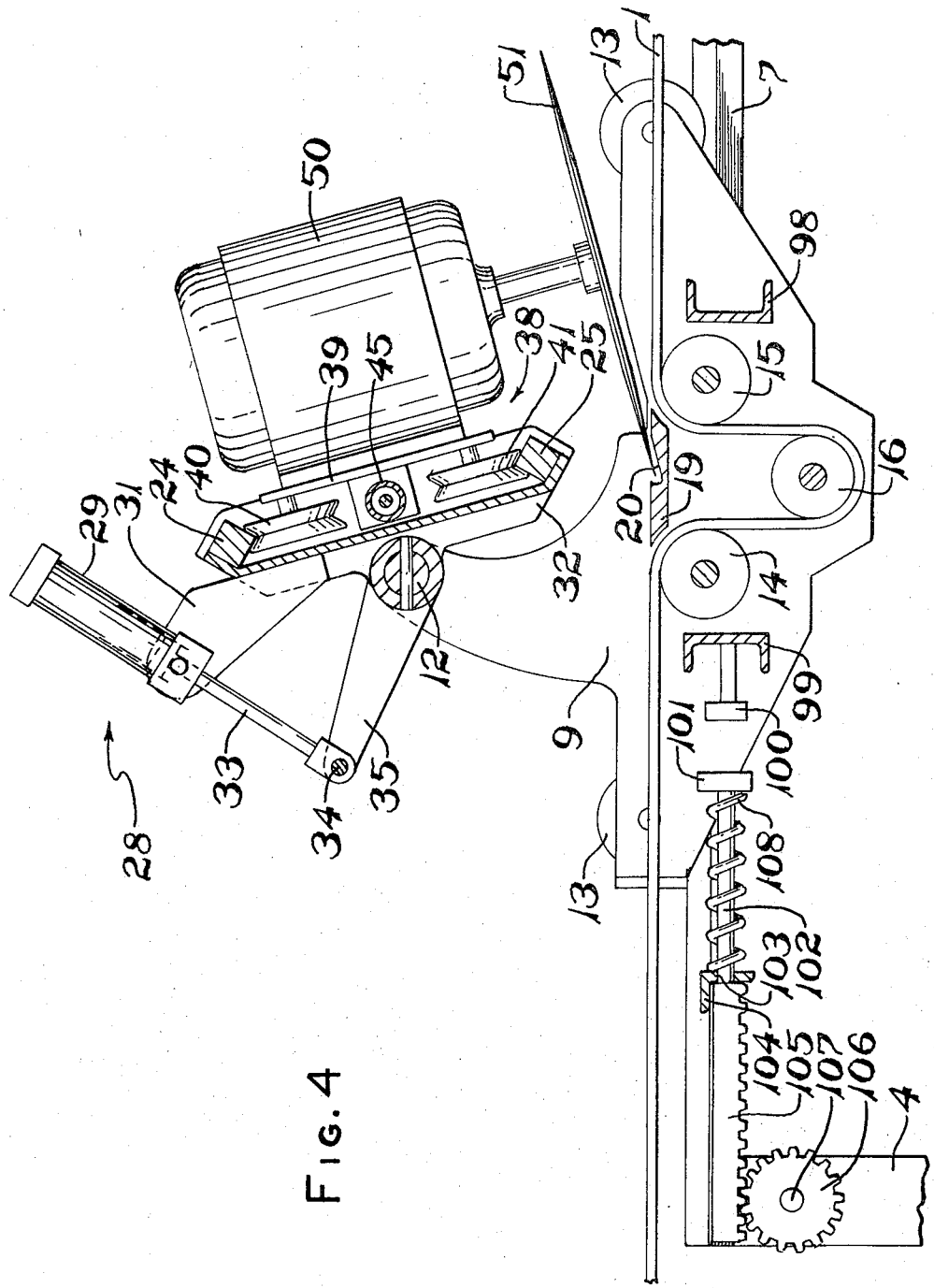

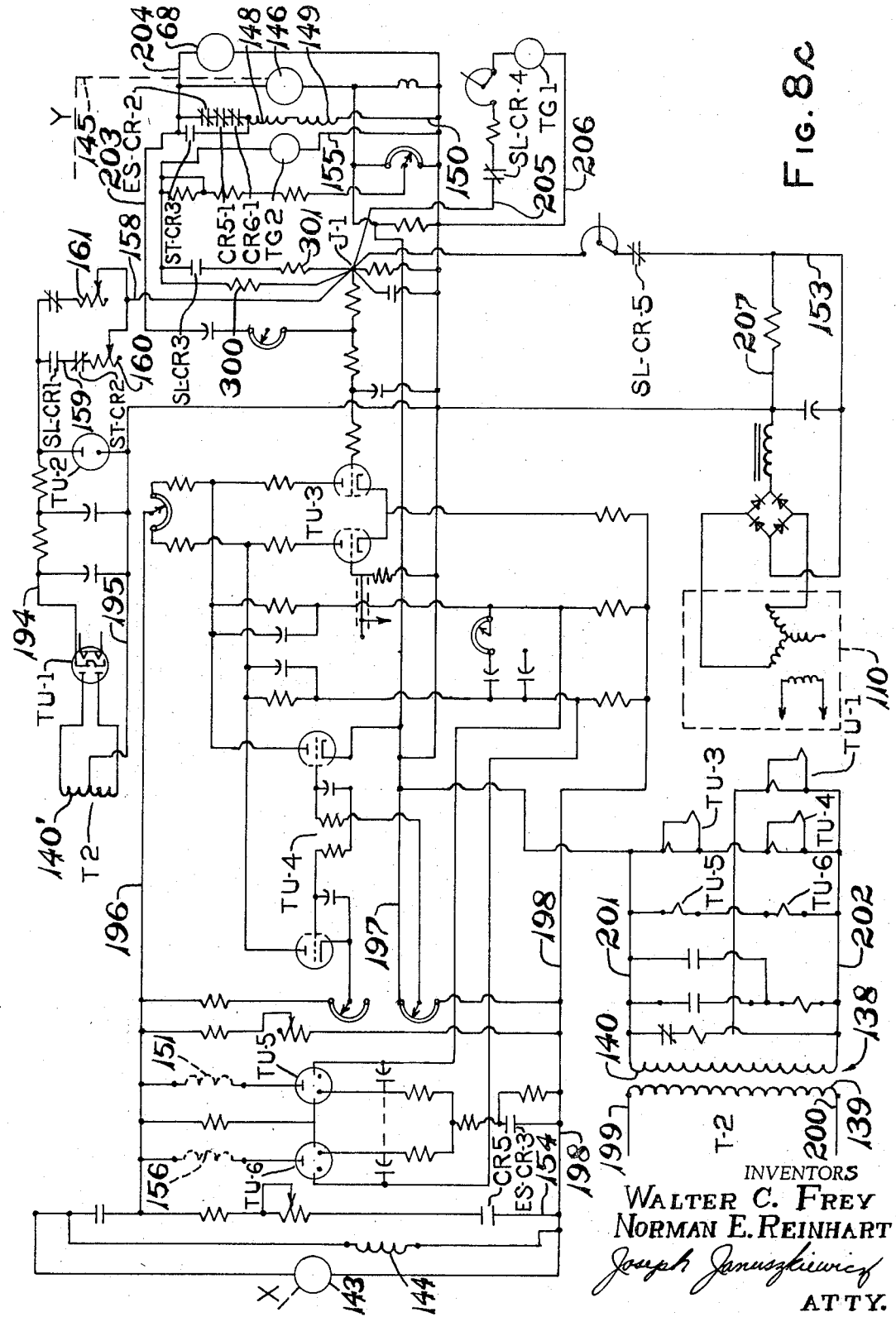

3,354,765
AUTOMATIC CUTTING DEVICE
Walter C. Frey, Akron, and Norman E. Reinhart, Cuyahoga Falls, Ohio, assignors to The B. F. Goodrich Company, New York, N.Y., a corporation of New York
Filed Oct. 23, 1965, Ser. No. 504,014
18 Claims. (Cl. 83—71)

ABSTRACT OF THE DISCLOSURE

An automatic tread cutting apparatus having a longitudinally reciprocable carriage with a laterally movable cross slide and knife thereon in cooperation with a continuously moving conveyor which carries a continuous length of tread stock wherein the drive means of the carriage is directly and positively coupled to the drive of the conveyor to provide equal linear speeds of the carriage and conveyor with separate drive means coupled to the carriage drive means to vary within precise limits the carriage direction and speed.

---

This invention relates to an automatic cutting apparatus and more particularly to a cutting device which severs continuously moving strip stock into sections of predetermined length.

In the manufacture of tread stock for pnuematic tires, rubber or synthetic rubber composition is calendered, thence extruded into a continuous length of desired cross sectional shape or contour. The tread stock is then cut to proper length as by a skiving operation which produces a cut at a diagonal relative to the longitudinal length of the stock to facilitate application to a tire carcass. The cut tread stock is spliced at the ends thereby forming an annular band of a given diameter. It is desirable to cut the pieces in desired length in a continuous operation wherein the advancing strip stock is supported on the upper run of an endless conveyor belt. As such strip stock is being advanced, a carriage carrying a cutter is synchronized with the belt and arranged to sever the stock while the stock is supported on the belt and while the carriage is advancing at the same rate as the belt. The cutter is then retracted to a starting position to repeat the cycle. In such operation it is important to cut the tread to the exact length consistently and accurately over a range of sizes in order to effect economies in production and manufacture a tire of high quality. In the event a tread stock was cut too long, the resulting annular band would impose a buildup of tread stock on a specific location and would present a dynamically unbalanced tire.

Heretofore, the automatic tread stock cutting devices employed a movable carriage supporting a cross slide which carried a knife, wherein such carriage was controlled in its longitudinal movement relative to a movable conveyor by energization of clutches in response to electronic counters. In addition, the attempt to lock the carriage to the conveyor resulted in additional errors in cut length due to uneven loading of the conveyor by the carriage, which was of considerable mass. Variations in the speed of conveyors as well as in carriage speeds due to changing loads, the overcoming of inertia under variable conditions of actual production resulted in variation in the length of cut desired. Since such tread stock is constantly sprayed with water, difficulty is encountered in moving the bulky carriage, cross slide and knife head with precision over the wet rails. Additionally, the problems of overcoming mass inertia, back lash, slippage and variations in load as well as thickness in tread being cut must be overcome.

The present invention overcomes these difficulties through a novel construction of drive control means which assures precise positive control between a reciprocal carriage of large mass and a constantly moving belt under variable operating and load conditions. The present invention has a direct positive drive relationship at all times between the input to the conveyor and the carriage rather than an intermittent drive connection between the conveyor and the carriage. In addition, such apparatus does not tension the tread stock in its operating cycle thereby assuring greater control.

An object of this invention is to provide an improved cutting apparatus which efficiently cuts continuously moving material to accurate predetermined elngths.

Another object of this invention is to provide a novel tread cutting apparatus which effectively cuts a continuously moving tread stock to predetermined lengths over a range of sizes.

Another object of this invention is to provide a positive control between a longitudinally moving belt and a reciprocable carriage that has a laterally movable rotary knife thereon.

It is a further object of this invention to maintain a positive control over the positions of the movable carriage with its skiving knife relative to the continuously moving conveyor belt.

A further object of this invention is to provide a novel control means for an automatic tread cutting apparatus which accurately severs a predetermined length of tread stock while the tread stock moves continuously with a conveyor in an efficient and economical manner.

These and other objectives achieved by this invention will become more apparent as this description proceeds in connection with the accompanying drawings, in which:

FIG. 1 is a plan view of an apparatus forming an embodiment of this invention with the cross slide and cutter head removed to better show the parts.

FIG. 2 is a side elevational view of the cutting apparatus.

FIG. 3 is a perspective view of a section of tread stock.

FIG. 4 is a side elevational view on an enlarged scale of a portion of the cutting apparatus, partly broken away and partly in section.

FIGS. 8a, 8b and 8c illustrate a suitable electrical wiring diagram for controlling the electrical components of the apparatus.

Figure 5:
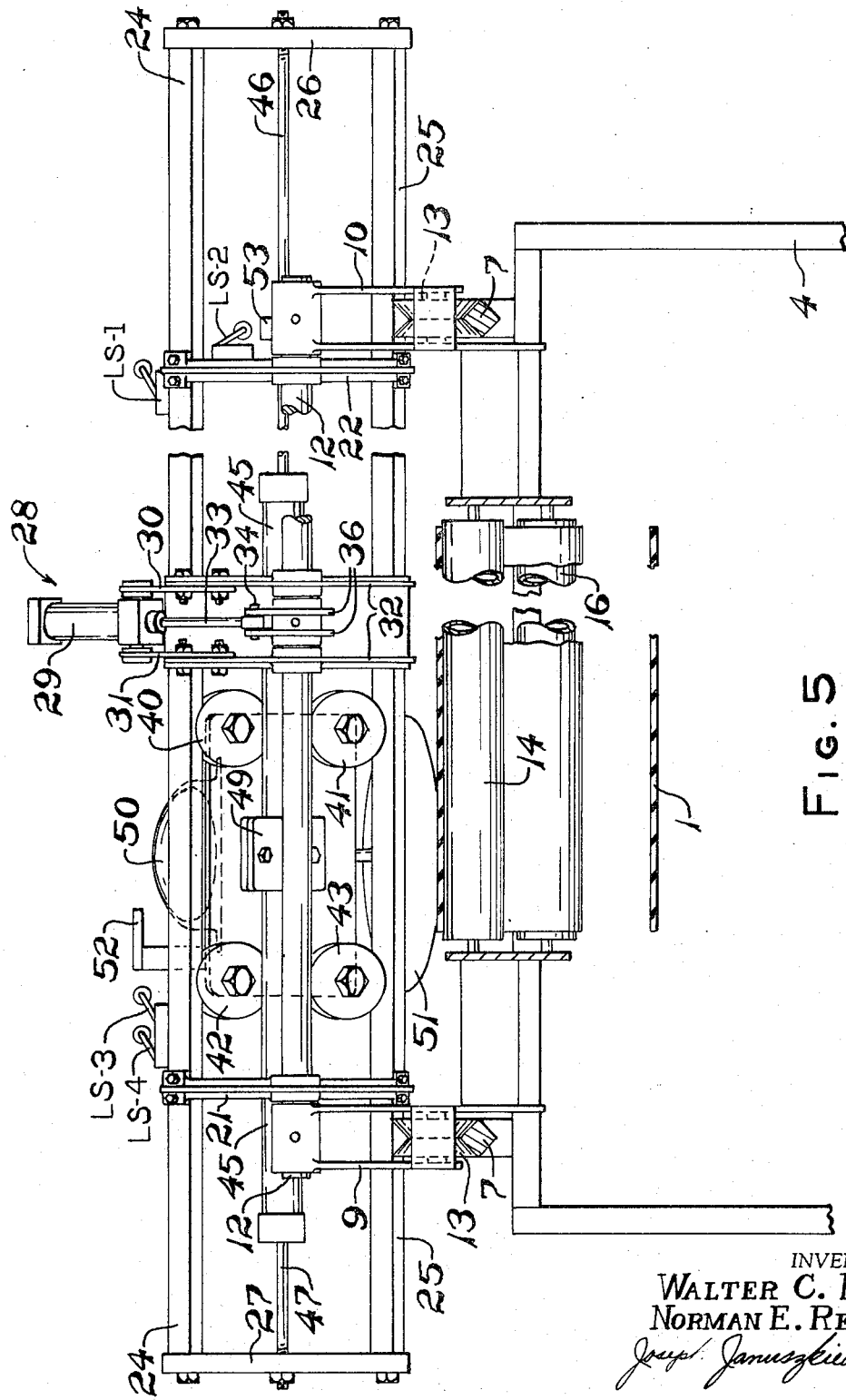
FIG. 5 is a rear elevational view of the carriage and cross slide mount with the rotary cutter head shown in phantom lines.

Referring now to the drawings, wherein like reference characters designate like or corresponding parts throughout the several views, there is shown in FIG. 1 an endless conveyor belt 1 operating over a driven roller 2, an idler roller 3, and supported by a structural framework 4. Such conveyor operates continuously at a preselected speed and is adapted to carry a continuous length of tread stock 5. Framework 4 supports a plurality of idler rollers 6 (FIG. 2) which supports the endless conveyor belt 1 in its travel. Positioned on each side of the conveyor is a pair of spaced rails 7 which are adapted to support a reciprocating carriage 8. Essentially the frame of the carriage comprises a pair of spaced side plates 9 and 10 retained in spaced relationship by suitable cross members including structural cross member 12 which is shown more clearly in FIG. 5. Carriage 8 has a plurality of spaced wheels 13 which support the cariage on the guide rails 7 for movement thereon. Carriage 8 has journaled on its side plates 9 and 10 a pair of laterally extending conveyor belt idler rollers 14 and 15 whose axes are parallel to each other. Mounted closely adjacent thereto but in a plane lower than rollers 14 and 15 is idler roller 16. The axis of idler rollers 14, 15 and 16 are parallel to the axes of rollers 3 and 2 and guide the conveyor belt downwardly over idler roller 14, under idler roller 16 and then over idler roller 15. A horizontally extending plate 19 is mounted between rollers 14 and 15 having its respective end portion secured to the side plates 9 and 10. The upper surface of such plate 19 is substantially coplanar with the upper surface conveying run of the conveyor belt to facilitate the movement of the tread stock 5 thereover. Plate 19 has a laterally extending recess 20 to accommodate the knife edge to be described in the cutting operation. Pivotally mounted on the respective end portions of structural cross member 12 is a pair of support members 21 and 22 (FIG. 5). Secured to the respective end portions of the support members 21 and 22 are a pair of guide rails 24 and 25, the outboard ends of which are secured to support members 26 and 27. To pivot the support members 21, 22 and the guide rails 24 and 25 about the cross member 12, a hydraulic cylinder 28 has its cylinder portion 29 pivotally secured via brackets 30, 31 to cross braces 32 which cross braces 32 interconnect the respective guide rails 24 and 25. Hydraulic cylinder 28 has its piston rod 33 pivotally connected as at 34 via brackets 35 and 36 to the structural cross member 12.

Mounted for lateral movement on the carriage 8 is a cross slide 38 comprising a support frame 39 which is slidably supported on the guide rails 24 and 25 via rollers 40, 41, 42 and 43 (FIG. 5). A laterally extending double-acting cylinder 45 has the respective outer end portions of the piston rods 46 and 47 secured to the support members 26 and 27. The movable cylinder 45 is secured via bracket 49 to the support frame 39 of cross slide 38. Rectangular shaped frame 39 has a motor 50 mounted thereon operatively connected to drive a knife or cutter disc 51. In order to position the motor so that the cutter disc 51 is in cutting relationship with the tread stock 5, hydraulic cylinder 28 is adapted to be pressurized selectively to pivot the respective guide rails 24, 25, frame 39, motor 50 and cutter disc 51 about structural cross member 12 into the position shown in FIG. 4. Pressurization of the rod end of hydraulic cylinder 28 as viewed in FIG. 4 pivots such cross slide 38 which includes frame 39, guide rails 24, 25 and motor 50 in a counterclockwise direction about cross member 12. Cross slide 38 has a cam 52 (FIG. 5) secured to the frame 39, which cam 52 is in alignment with limit switches LS-1, LS-3 and LS-4, mounted in spaced relationship on the guide rail 24.

Limit switches LS-1 and LS-14 control the extent of the transverse movement of the cross slide 38 while limit switches LS-1, in cooperation with LS-2 and LS-3, control the tilting of the knife or cutter disc 51. Assuming the knife or cutter disc 51 is making a cross cut on the tread stock laterally across the conveyor, the cam 52 actuates limit switches LS-3 and LS-4. Switch LS-3 actuates cylinder 28 to raise the knife disc 51 up away from the tread stock while switch LS-4 actuates a solenoid valve which pressurizes the one end of cylinder 45 to return the cross slide 38 to its starting position. As such cross slide 38 is tilted back away from the tread stock, cross slide 38 along with guide rails 24, 25 and support members 21 and 22 are also tilted back, such that limit switch LS-2 comes in contact with cam 53 (FIG. 5) mounted on stationary side plate 10 conditioning the electrical circuit to be described for the next cutting operation. As the cross slide 38 completes its movement from left to right, as viewed in FIG. 5, cam 52 actuates limit switch LS-1 which actuates air cylinder 28 to tilt the cross slide 38 downward into position for its cutting cycle. Such short description of the transverse control movement of the cross slide 38 will be further described hereinafter in conjunction with the electrical circuit to be described.

Figure 7:
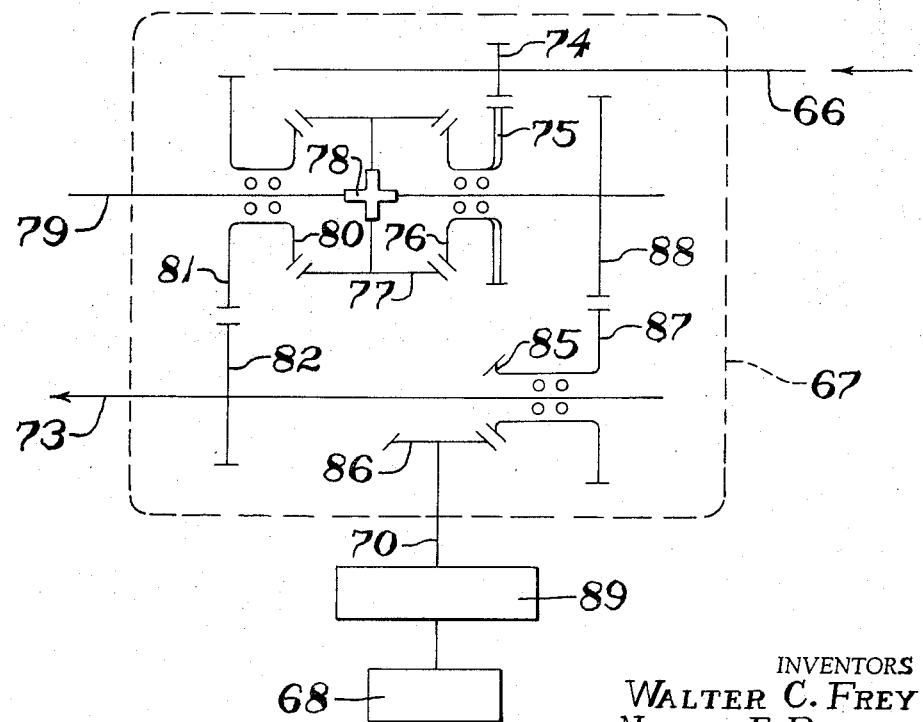
FIG. 7 is a schematic diagram of the transmission.

As seen in FIG. 1, the conveyor 1 is driven by a sprocket 58 which in turn is connected by a sprocket chain 59 to a sprocket 60. Sprocket 60 is keyed to shaft 61 which is the output shaft of right angle drive means 62. The input to right angle drive means 62 is from a motor 63. Motor 63 has a second output shaft 64 which rotates at the same constant speed as the output shaft 61. Output shaft 64 through coupling 65 drives a shaft 66 which is the first input means to a differential transmission 67 shown schematically in FIG. 7. A motor 68 through coupling 69 drives shaft 70 which is the second input means to the differential transmission 67.

The differential transmission 67 comprises a housing which journals for rotation input shaft 66, 70 and output shaft 73. A gear 74 keyed to shaft 66 meshes with gear 75, which gear 75 has secured for rotation therewith a side gear 76. Side gear 76 is in constant mesh with spider pinions 77 which are connected to the spider 78 and spider shaft 79. Also in constant mesh with spider pinions 77 is side gear 80, which gear 80 is freely journaled on spider shaft 79, as is gear 75. Side gear 80 is secured to spur gear 81, which spur gear 81 meshes with a spur gear 82 that is keyed to the output shaft 73.

Freely journaled on output shaft 73 is a bevel gear 85 meshing with a bevel gear 86 which is keyed to input shaft 70. Bevel gear 85 is secured to a spur gear 87 for rotation therewith on shaft 73. Spur gear 87 meshes with a spur gear 88 which is keyed to the spider shaft 79.

With the shaft 66 coupled to motor 63, gear 74 is rotated at a preselected constant speed, which in turn imparts a fixed speed to gear 75 and the side gear 76. With shaft 70 held stationary by a brake device 89, gears 86, 85, 87 and 88 are held fixed which likewise hold spider shaft 79 stationary. The spider pinions 77 are rotated at a speed proportional only to that imparted thereto by side gear 76 which thereby imparts the same speed to side gear 80 and spur gear 81. Gear 81 meshes spur gear 82 which in turn is keyed to output shaft 73 thereby transferring such rotation to output shaft 73, driven at a speed determined only by the speed of rotation of input shaft 66 which is thereby assumed to be condition number 1. For a second condition, assume motor 68 is energized and that shaft 70 is driven at a preselected speed which in turn drives gears 86, 85, 87 and 88 as well as spider shaft 79. Assuming that motor 68 rotates spider shaft 79 at the same speed and in the same direction as side gear 76, spider pinions 77 will not impart any rotation to side gear 80; thereby gears 80, 81 and 82 as well as output shaft 73 will remain stationary. For a third condition, assume that the speed of motor 68 is increased which in turn speeds up the rotation of the spider shaft 79. Such increase in speed of shaft 79 will impart a reverse rotation to side gear 80, i.e. in a direction opposite to that in which side gear 76 is rotating thereby imparting a reverse rotation to output shaft 73. Reduction of the speed of motor 68 will slow down the rotation of the output shaft 73 until the inputs to pinions 77 are equal, at which time the output shaft 73 is zero or stationary. The reduction of speed of motor 68 still further (below the speed of motor 63) will cause the output shaft 73 to rotate in the same direction as shaft 66 of motor 63. Further reduction in the speed of motor 68 will increase the speed of rotation of the output shaft until motor 68 is braked, at which point the output shaft 73 will be at full speed and in the same direction as that of input shaft 66 of motor 63.

The output shaft 73 transfers its rotation via a timing belt 90 to a threaded rod 92 which is in complementary engagement with a threaded block 93. Threaded block 93 is suitably secured via angularly disposed angle frames 94, 95 and supports 96 and 97 to carriage 8. Selective rotation of threaded rod 92 imparts the desired linear movement to the carriage 8 to position such carriage to make the desired cuts as to be explained.

The rear portion of carriage 8 has a laterally extending cross support member 99 which carries a stop member 100 which may be adjustable, however, shown in FIG. 4 as fixed. In longitudinal alignment with stop member 100 is an abutment 101 mounted on one end of a longitudinally extending rod 102 which rod 102 is slidably received by the bore 103 of a laterally extending support 104. Support 104 is attached to the framework 4. The other end of rod 102 is attached to a rack 105 that is in mesh with a spur gear 106 mounted on a shaft 107. A spring 108 encompasses rod 102 between the support 104 and the abutment 101 biasing the one end of such rack 105 into contact with the support 104. Shaft 107 is connected to a rotary transformer 110 shown schematically in FIG. 8c, for a purpose to be described.

Figure 8A:
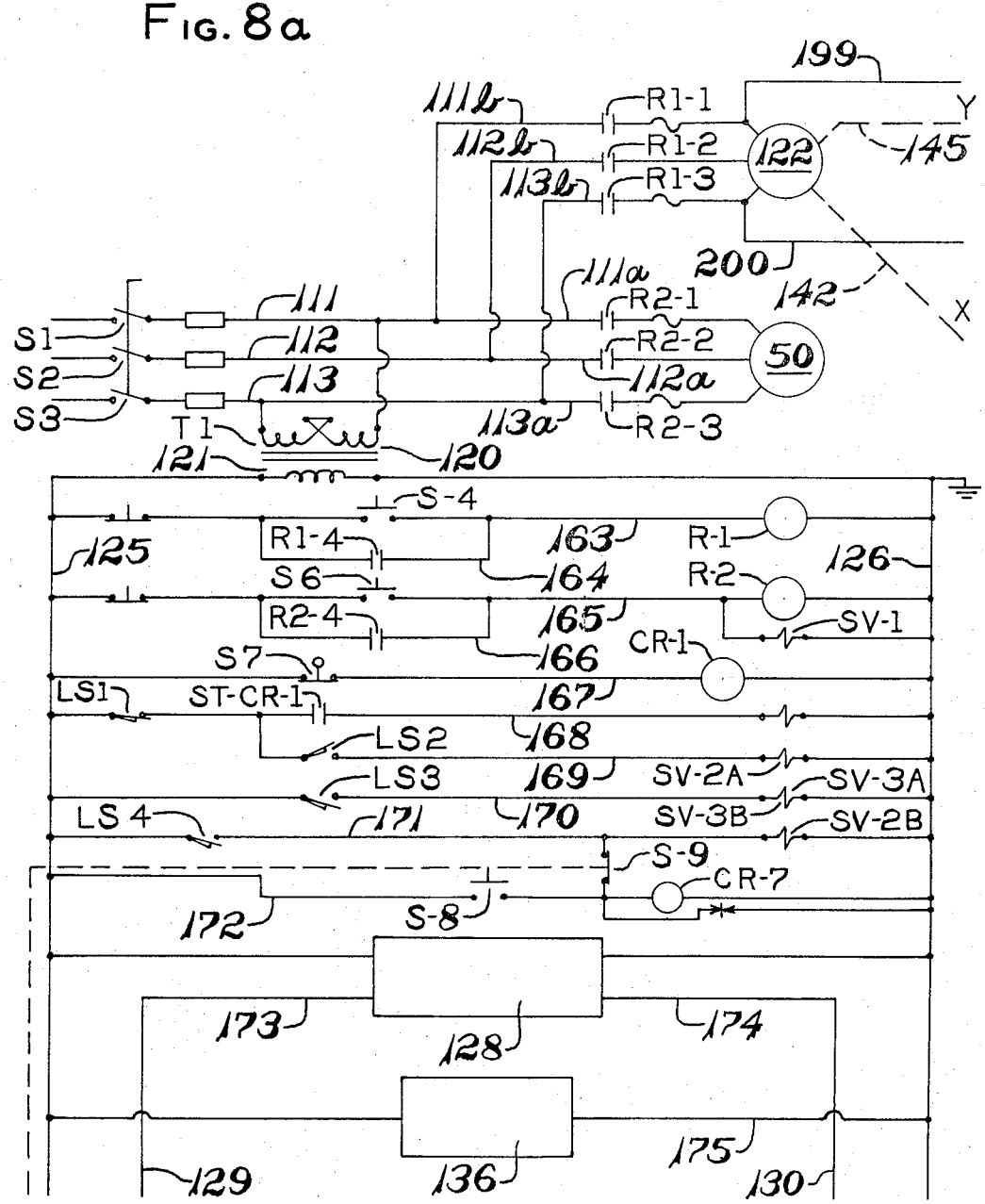
Figure 8B:
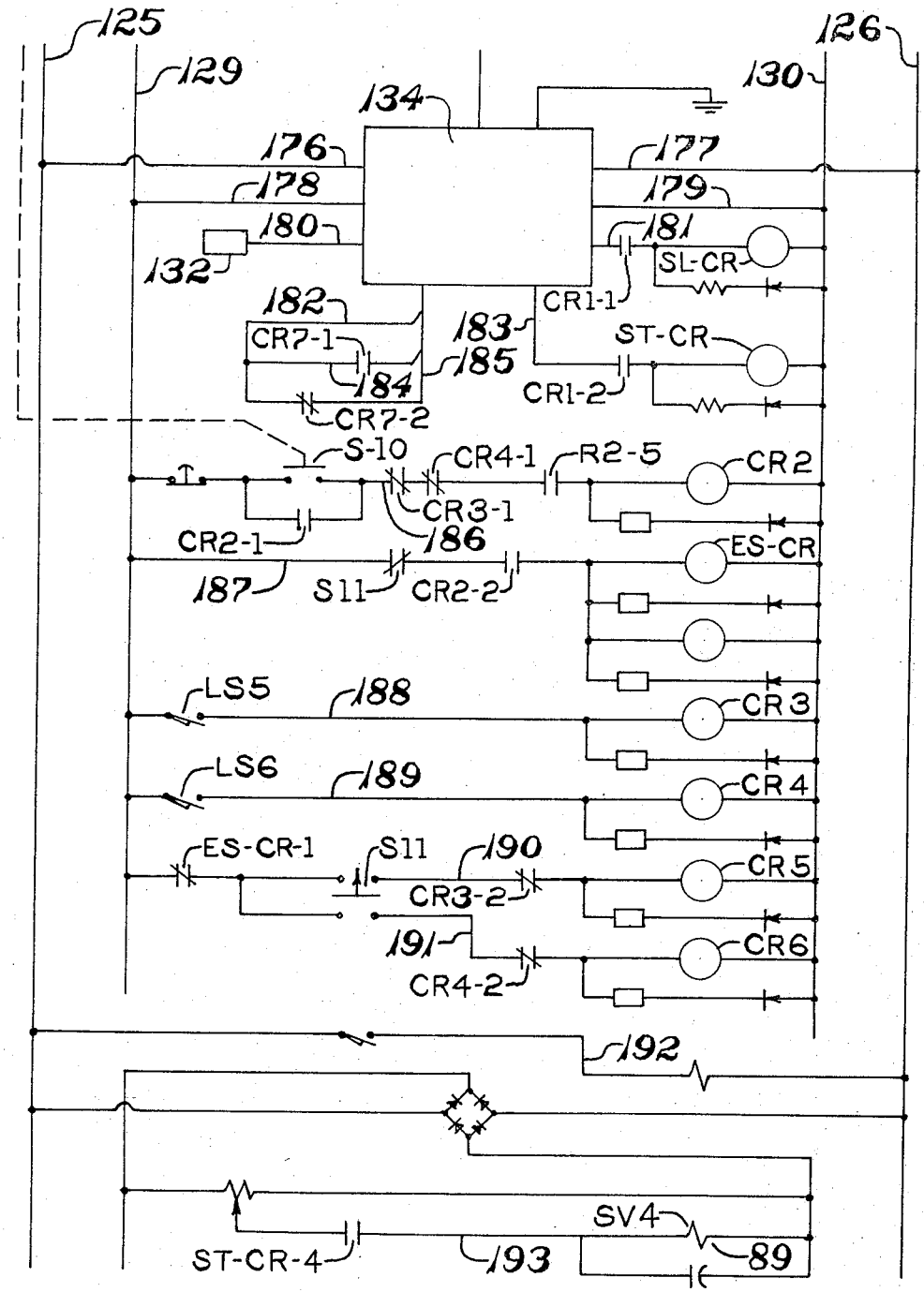

The electric control circuitry for the tread cutter is shown in FIGS. 8a, 8b, and 8c. Power is supplied through the conductors 111, 112 and 113 to the primary winding 120 of the transformer T-1 where the voltage is stepped down to 120 volts in the secondary winding 121. Conductors 111, 112 and 113 supply current via branch conductors 111a, 112a and 113a to a knife motor 50 and via branch conductors 111b, 112b and 113b to an amplidyne motor 122. Conductors 111a, 112a and 113a each have open contacts R2-1, R2-2 and R2-3, respectively, subject to being closed by a relay R2 to be identified. Conductors 111b, 112b and 113b each have open contacts R1-1, R1-2 and R1-3 subject to being closed by a relay R1 to be identified.

The secondary winding 121 is connected between the main conductors 125 and 126 of the central circuit. A number of branch circuits are connected between the main conductors for sequentially controlling certain of the functions of the apparatus through the control of the relays, limit switches and solenoid operated valves to be described.

A step-down DC converter 128 is connected between conductors 125 and 126 of the control circuit from which a 12 volt DC supply is obtained. The output of such DC converter is connected between conductors 129 and 130 from which a number of branch conductors are connected for sequentially controlling via relays and limit switches, to be described, certain of the functions of the apparatus.

Figure 6:
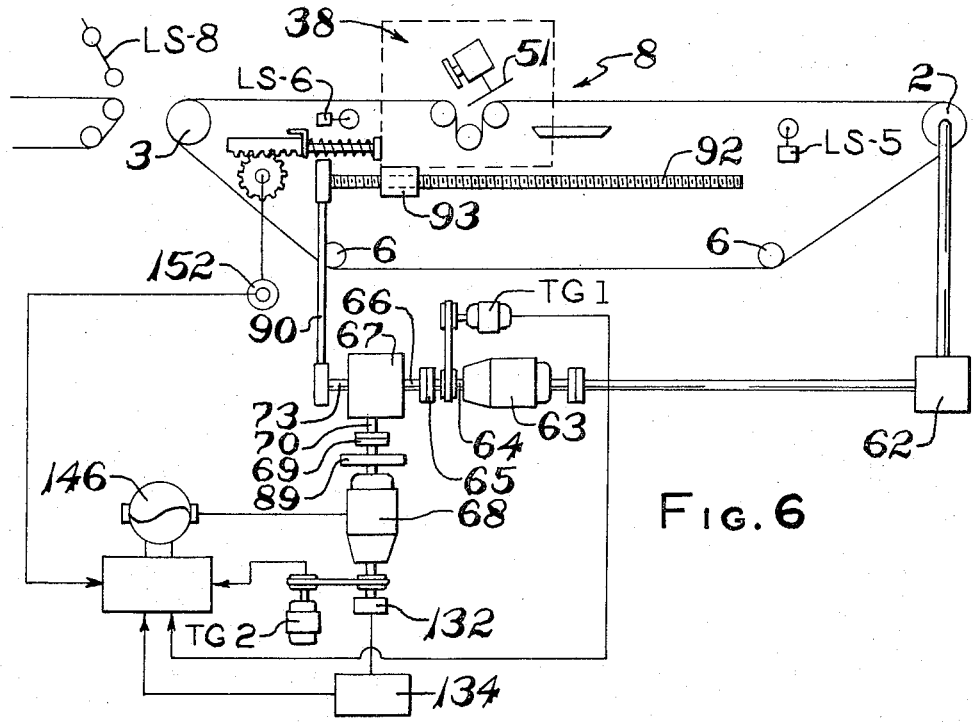
FIG. 6 is a schematic view showing the relationship of parts of the cutting apparatus.

Integrated into such circuit is a digital measuring and control unit 134 (between conductors 176 and 177) which receives pulses from an encoder or a digital tachometer designated as 132 (FIGS. 1 and 6). Such encoder or tachometer 132 is not illustrated in detail because it is a conventional commercially available item such as manufactured by Data Tech, Cambridge, Massachusetts, designated as an incremental encoder. Such encoder or tachometer 132 is mounted on the end of the shaft from motor 68 and generates pulses of electricity in response to revolutions or portions of revolutions of the shaft from motor 68 for transmission via conductor 180 to a digital measuring and control unit 134 known as "NAVCOR" such as manufactured by the Navigation Computer Corporation which is commercially available. Such digital measuring and control unit 134 compares the number of pulses received with the number preset on a panel as by a card reader 136 on conductor 175. Such card readers 136 operate from coded cards which are old and well known in the art. Card reader 136 presets control unit 134 to close contacts and send a first pulse signal to energize a slow control relay SL-CR which is connected to the control unit 134 via conductor 181 through a normally open contact CR1-1. Card reader 136 also presets control unit 134 to close a contact and send second pulse signal to energize a stop control relay ST-CR which is connected to the control unit 134 via conductor 183 through a normally open contact CR1-2. Such control relays ST-CR and SL-CR upon energization close contacts to be described to control the slowing down and stopping of motor 68 to thereby synchronize mechanically the carriage 8 which carries the knife cutter 51 with the conveyor belt 1 which carries the tread stock, without locking mechanically the carriage to the conveyor belt 1.

With the closing of switches S-1, S-2 and S-3 on conductors 111, 112 and 113, the primary winding 120 of transformer T-1 is energized thereby energizing the secondary winding 121 and conditioning the control circuit for operation. A complete circuit is made through the main conductors 125 and 126 and conductor 163 upon closing of starter switch S-4 to energize relay R1 which closes contact R1-4 which locks in a holding circuit to such relay R1. Additionally relay R1 closes normally open contacts R1-1, R1-2 and R1-3 on conductors 111b, 112b and 113b to (1) thereby supply current to energize the amplidyne motor 122 and (2) supply current via conductors 199 and 200 to amplifier 138. Amplifier 138 is part of an electronic amplidyne unit commercially available, such as manufactured by General Electric Company. Such amplidyne unit includes a transformer T-2 having a primary coil 139, a secondary coil 140 whose output is fed to certain of the tubes (designated TU-1 to TU-6) in the amplifier 138 which together with certain elements operates the control over a system to be described.

The amplidyne motor 122 is mechanically coupled via a connection 142, shown in dotted lines, to the amplidyne exciter 143 which generates a constant DC voltage to the shunt field 144 of control motor 63 (FIGS 1 and 6) and supplies a B+ voltage for the amplifier 138. The amplidyne motor 122 is also mechanically coupled via a connection 145 shown in dotted lines to drive an amplidyne generator 146. The output voltage of amplidyne generator 146 is fed to the armature of the control motor 68. The fields 148 and 149 on conductor 150, between conductors 204 and 197, upon excitation, forces the voltage of the amplidyne generator 146 to zero thereby stopping the rotation of the control motor 68. It will be noted that fields 148 and 149 on conductor 150 will not be energized until contact ST-CR-3 is closed which is controlled by stop control relay ST-CR. Stop control relay ST-CR as previously described is energized when the pulses generated by the digital encoder 132 which is connected to motor 68 match the preset number of revolutions preset by the card reader 136 through the digital counter 134.

A knife motor 50 is energized by the depression of switch S-6 on conductor 165 which in turn enegizes relay R2 thereby closing contacts R2-1, R2-2 and R2-3 on lines 111a, 112a and 113a thereby conditoning the rotary knife for a cutting operation. Depressing of switch S-6 also put in the holding circuit on conductor 166 through the closing of contact R2-4, and energizes solenoid valve SV1 on conductor 166a which directs pressurized air to the pneumatic control system. Depressing of switch S-6, through the energization of control relay R-2 closes contact R2-5 on conductor 186 which conditions control relay CR2. Energization of control relay CR2 (conductor 186) closes contact CR2-2 (conductor 187) to condition the emergency stop control relay ES-CR for operation. Energization of control relay ES-CR conditions the running of motor 68 either by manual operation or automatic operation.

A normally closed switch S-7 in the control panel on conductor 167 energizes control relay CR1 which closes contacts CR1-1 and CR1-2 on conductors 181 and 183, respectively. Contacts CR1-1 and CR1-2 condition the slow and stop control relays SL-CR and ST-CR for operation.

Assuming a motor generator set or other suitable source of power supply is to supply electricity to the motor 63 which is to run the conveyor at a preset constant speed, the operator presses start cutter switch S-8, conductor 172, which opens switch S-9 and closes switch S-10 interconnected therewith. Closing of switch S-10 on conductor 186 energizes control relay CR2 which closes contact CR2-1 to lock in a holding circuit and closes contact CR2–2 on conductor 187 which actuates the emergency stop control relay ES–CR and conveyor control relay C–CR. The latter relay C–CR closes a contact not shown to energize the conveyor motor 63 which in turn through transmission 62 drives the conveyor 1 at a preset constant speed. In addition, when motor 63 is energized, it provides an input to the differential transmission 67 and is condition 1 previously described wherein only motor 63 is energized and it drives the conveyor belt 1 as well as feed screw 92 at the same speed.

Amplidyne motor 122 as described is energized by the closing of switch S–4 which energizes relay R1 which in turn closes contact R1–4, the holding circuit, and contacts R1–1, R1–2 and R1–3. The amplidyne generator 146 via mechanical connection 145 thereby conditions motor 68 for rotation on excitation of its shunt field 151 to be described.

With control relay ES–CR on conductor 235 energized as described, contact ES–CR–1, ES–CR–2 and ES–CR–3 are actuated. Normally closed contact ES–CR–1 is opened as is also contact ES–CR–2 on conductor 150 between conductors 204 and 197. This latter action opens the circuit to fields 148 and 149 which thereby permits amplidyne generator 146 to supply power for motor 68. Opening of contact ES–CR–1 on line 190 interrupts manual control of the carriage 8 which otherwise may be done manually by switch S–11 selectively through conductors 190 and 191. Conductors 190 and 191 have control relays CR5 and CR6 as well as contacts CR3–2 and CR4–2, respectively. Normally open contact ES–CR–3 between conductors 198 and 196 through tube TU–5 will be closed thereby conditioning amplidyne field 151 of amplidyne generator 146 which action conditions the armature of control motor 68 for operation.

Depressing start cutter switch S–8 also energizes control relay CR7 which closes contact CR7–1 (conductor 184) and opens contact CR7–2 to reset the counter for the counting operation.

Limit switch LS–1 on conductor 168 operates through normally open contact ST–CR–1 to energize solenoid valve SV–2A which actuates pneumatic cylinder 45 to move the cross slide 38 (frame 39, motor 50, and cutter disc 51) laterally across the conveyor belt 1 for a cut. Limit switch LS–1 in cooperation with normally open limit switch LS2, which is closed whenever the cross slide 38 is in noncutting position as shown in FIG. 2, energizes solenoid operated valve SV–3A which actuates pneumatic cylinder 28 to tilt the cross slide 38 into cutting position as shown in FIG. 3. Limit switch LS3 on conductor 170 upon actuation by the cam 52 energizes solenoid operated valve SV–3B which actuates the pneumatic cylinder 28 into the position shown in FIG. 2 with the cutter disk 51 in the non-cutting position. Limit switch LS4 on conductor 171 upon actuation by cam 52 energizes solenoid operated valve SV–2B which actuates pneumatic cylinder 45 to move the cross slide 38 laterally across the conveyor belt in preparation for a cutting action on the tread stock. As viewed in FIG. 5 such movement is from left to right.

Limit switch LS5 on conductor 188 is a safety switch on the forward end of the conveyor frame which limits the forward travel of the carriage 8, which upon actuation energizes control relay CR3 which opens normally closed contacts CR3–1 and CR3–2 on conductors 186 and 190, respectively. The opening of contact CR3–1 breaks the circuit to control relay CR2 which de-actuates emergency stop relay ES–CR which in turn conditions the circuit for stopping the carriage. The second action operates on the manual circuit to assure that in the manual operation of the carriage 8 that the carriage has a forwardmost limit. Limit switch LS6 on conductor 189 is the safety switch on the rearward portion of the conveyor frame which limits the rearward travel of the carriage 8, which upon actuation energizes control relay CR4 which opens normally closed contact CR4–1 and CR4–2 on conductors 186 and 191, respectively. The first action breaks the circuit to control relay CR2 which de-actuates emergency stop relay ES–CR which in turn conditions the circuit for stopping the carriage 8. Opening of contact CR4–2, conductor 191 operates on the manual circuit to prevent overrunning of the carriage 8 on the support through manual operation.

The carriage 8 in its rearward movement has abutment 100 moving into engagement with the stop 101 and moving rack 105 leftward as viewed in FIG. 4. Such action rotates gear 106 and a rotary transformer 152 (FIG. 8c) which supplies a control voltage through conductors 207 and 153 to the amplifier 138. The reference voltage supplied to the amplifier 138 for the energization of shunt field 151 of amplidyne generator 146 is via transformer T–2 whose secondary winding 140′ provides a voltage via conductors 194 and 195 either via the high return circuit of potentiometer 161 or the low advance circuit of potentiometer 160. A signal voltage is supplied from the tachometer generator TG2 (conductor 155 on the electrical diagram) to the amplifier 138 for modifying the reference voltage. A tachometer generator TG1 (between conductors 205 and 206) provides a signal to the junction J–1 which is the juncture of the opposing voltages from tachometer generator TG1 and the rotary transformer 152 and reference voltage. The sum of these voltages is fed to the input of the amplifier whose output controls the shunt fields 151 or 156 for control of the rotation of motor 68. Energization of field 151 rotates the amplidyne in a forward direction while energization of field 156 rotates the amplidyne in a reverse direction.

In the operation of the cutting machine, the circuit is energized as described above wherein the respective transformers T1 and T2 are energized, the D.C. converter 128 operating to supply current to the power conductors 129 and 130, the amplifier (conditioned for operation) and the conveyor motor 63 (energized to thereby move the conveyor 1 at a preset constant speed). Assuming a punched card in the card reader 136, the circuit of the digital counter 134 is conditioned for operation to send out a signal for actuating slow control relay SL–CR and stop control relay ST–CR in cooperation with the digital tachometer 132. As a condition of operation, it is further assumed that the cross slide 38 along with cutter disk 51 has completed a cross cut of the tread stock such that the cam 52 on cross slide 38 actuates limit switches LS–3 and LS–4. Limit switch LS–3 energizes solenoid operated valve SV–3B which in turn pressurizes the rod end of pneumatic cylinder 29 which tilts the cross slide 38 of knife 51 upwardly away from the tread stock to the position shown in FIG. 2. Such action trips limit switch LS–2 on cam 53 which conditions the operation of solenoid operated valve SV–3A (conductor 169) for tilting the knife down for the next cutting cycle. Limit switch LS–4 energizes solenoid operated valve SV–2B (conductor 171) which pressurizes the one end of double-acting cylinder 45 to move the cross slide 38 rightwardly as viewed in FIG. 4 or to the return position. Limit switch LS4 in addition energizes control relay CR7 which closes contact CR7–1 and opens contact CR7–2 on conductors 184 and 185 which resets the digital counter 134 to zero which de-energizes SL–CR and ST–CR. The closing of contact SL–CR–2 on conductor 159 directs a high reference voltage to the input of the amplifier 138 which directs an output to the amplidyne field 151 of amplidyne generator 146 which thereby rotates motor 68 at a very fast speed in comparison to conveyor motor 63. With the input from conveyor motor 63 to shaft 66 (FIG. 6) being at a speed X, and the input from motor 68 to shaft 70 at a speed 2X, the output shaft 73 rotates threaded rod 92 which in turn moves the carriage 8 rearwardly or in a leftward direction as viewed in FIG. 6. Such condition was previously referred to as condition 3.

The amplidyne field 151 through the amplifier 138 receives a first signal voltage as supplied by the tachometer generator TG1 which is additive to the reference voltage supplied via transformer T-2, conductors 194 and 195, potentiometer 161, conductor 158. Such reference voltage as modified by the first signal voltage from tachometer generator TG1 is further modified by a second signal voltage from the tachometer generator TG2 which is in opposition to such reference voltage to provide a modified control voltage. The algebraic sum of such voltages is fed to the input of the amplifier to thereby govern the speed of motor 68 which in turn determines the rate of movement of the carriage 8 to its initial starting position for a second cut. Such modified control voltage to the amplifier 138 is to be further modified in a manner to be described by an output from a rotary transformer 152.

Since the input to the differential transmission from motor 63 is a preset speed, while the input from motor 68 is a variable speed it is necessary to provide means for modifying the output of the differential transmission to take into account different preset speeds for motor 63, otherwise the cutting apparatus would not be flexible enough to handle tread stock of different sizes. To illustrate this, assume a heavy stock which requires a slow conveyor, thence the input to the differential transmission from motor 63 would be small and the input from motor 68 would be too great to be practical; whereas, if the conveyor were traveling fast, the input to the differential transmission from motor 63 would be great and the input from motor 68 would be insufficient to get the carriage back fast enough since the carriage would be progressively approaching the end of the cutting table with each cut until it could not complete a cut.

With the tachometer generator TG1 providing a signal that is proportional to the conveyor motor 63 which signal is additive to the reference voltage, a modified reference voltage is obtained that properly correlates the input of the variable speed motor 68 with the input from motor 63 whose output is then directed to the differential transmission 67 for the control of carriage 8.

As the carriage 8 moves further rearwardly, stop 100 comes into engagement with abutment 101 which in turn rotates gear 106 as well as rotary transformer 152 connected thereto. As the rotary transformer 152 is rotated a signal voltage is supplied therefrom through conductor 153 to the input of the amplifier 138. This signal is in opposition to the reference voltage as modified by the signal from the tachometer generator TG1 and TG2. Further rotation of rotary transformer 152 provides a greater voltage until it equals the modified reference voltage and maintains the rotation of motor 68 at a given rate of speed which will be assumed as X speed, which is also the speed of motor 63. With the speed of motors 68 and 63 being equal, condition 1 exists, previously described, wherein the input shafts 66 and 70 rotate at the same speeds so that the output shaft 73 is stationary. Under these conditions, the threaded rod 92 is also stationary so that the carriage 8 is also stationary; however, the tread stock continues to move past such carriage 8 at the same speed as the conveyor belt. Since motor 68 is still rotating, its output continues to record the rotation via the digital counter 132 which in turn relays such signals to the digital measuring unit.

The selected pre-punched code cards having set up the number of desired revolutions of shaft 70 (from motor 68) is conditioned to make certain contacts whenever the digital counter reaches such present number. Upon reaching the number of present revolutions desired, the digital measuring and control unit 134 sends a pulse of current through conductor 181 to energize slow control relay SL-CR which closes contacts SL-CR-1, SL-CR-3 and opens contacts SL-CR-2, SL-CR-4 and SL-CR-5. Contact SL-CR-2 (conductor 158) is opened thereby interrupting the high return reference circuit to the input of amplifier 138 and in place thereof contact SL-CR-1 on conductor 159 is closed which inserts the low advance reference voltage through potentiometer 160 as compared to potentiometer 161 on conductor 158 via contact SL-CR-2. In addition, with the closing of contact SL-CR-3, the resistance is decreased in the line from tachometer generator TG2 via conductor 203 while contact SL-CR-4 is opened breaking the circuit from tachometer generator TG1 thereby further reducing the signal to the input of the amplifier 138 and the output of amplifier 138 as well as to the field winding 151. In addition, contact SL-CR-5 is opened to thereby remove the signal from the rotary transformer 152. Thus the reference voltage to the amplifier 138 via the low advance circuit through contacts SL-CR-1 and ST-CR-2 (conductor 159) is only modified by the reduced voltage from tachometer generator TG2 via parallel resistors 300 and 301 (closely adjacent junction J-1) since the signals from tachometer generator TG-1 and the rotary transformer 152 are removed. With control field winding 151 of amplidyne generator 146 receiving a smaller voltage the output of motor 68 will be reduced causing input shaft 70 to rotate at a preset slower speed. Accordingly, the spider pinions 77 will rotate in a direction dictated by the rotation of side gear 75 which is the input from motor 63. Side gear 80 will be rotated in a direction to drive the carriage in a forward direction (i.e. in the same direction as that the material) which for purposes of illustration is assumed to be at 9/10 of the speed of the material. The speed of the carriage in a rightward direction (as viewed in FIG. 1) is slightly less than the speed of the conveyor such that the tread is traveling at a slightly faster speed than the carriage. Such action conditions the carriage and circuit for the cutting operation.

It is to be noted that the variable speed motor 68 at this time always rotates at a fixed speed since the low advance circuit is always the same; therefore, the energy that must be expended to stop motor 68 to synchronize the conveyor belt 1 and the carriage 8 is always the same which therefore assures a consistent cut. As an example, to better illustrate this, assume that the conveyor belt is being driven at 600 inches per minute and that motor 68 is driven at 50 r.p.m. which for purposes of illustration will be considered as 50 inches per minute, then the carriage speed will be (600 inches/min. —50 inches/min.) 550 inches per minute. To synchronize the conveyor belt 1 and the carriage 8 it is necessary to stop the inertia of motor 68 which is a constant of 50 inches per minute. Since this is constant for each cut, the amount of energy necessary to brake motor 68 is always constant and therefore the cut will be consistent. If it is assumed that the conveyor belt is driven at 500 inches per minute then the carriage will be driven at (500—50) 450 inches per minute with the motor 68 still being driven at 50 r.p.m. or 50 inches per minute. To bring the carriage 8 up to the speed of the conveyor belt 1 it is necessary to stop motor 68 and dissipate the energy of its inertia which is going at 50 r.p.m. Thus for each preselected speed of motor 63, the necessary energy to stop motor 68 is always the same to provide a consistent cut.

As motor 68 rotates, the counter connected thereto continues to count the revolutions of shaft 70 until the counter registers the same number as preset by the card reader. The digital counter thereon sends an impulse through conductor 183 to actuate stop control relay ST-CR which in turn closes contacts ST-CR-1, ST-CR-3 and ST-CR-4 while opening ST-CR-2. The opening of contact ST-CR-2 on conductor 159 interrupts the fixed reference voltage via conductor 159 to the input of the amplifier 138 and to the amplidyne field 158 while the closing of contact ST-CR-3 between conductors 204 and 150 energizes control fields 148 and 149 which forces the amplidyne generator 146 voltage to zero to stop motor 68. The input to input shaft 70 is zero as well as to spider shaft 79, so that the only input to side gear 80 is the input from motor 63 via shaft 66, gears 74, 75 and side gear 76. Thus the output to output shaft 73 (and to the carriage 8) is from motor 63 so that the conveyor 1 and carriage 8 are moving at the same speed and in the same direction, this being condition 1 described above. At this point, as mentioned above, the digital measuring and control unit 146 has indicated that a proper unit of length of tread stock has passed underneath the carriage and is ready for cutting. Simultaneously with such above-described action of opening contact ST–CR–2 and closing of contact ST–CR–3, contact ST–CR–1 on conductor 168 is closed and energizes the coil on solenoid operated valve SV–2A which pressurizes pneumatic cylinder 45 and thereby moves the cross cut carriage laterally to perform its transverse movement across the conveyor to make the cut on the tread stock. Simultaneously with such action, contact ST–CR–4 on conductor 193 is closed which thereby energizes solenoid operated valve SV–4 which operates the brake on motor 68 to positively lock the output of motor 68 from rotating. With the locking out of motor 68 through the above described means, the input to the differential transmission 67 is directly proportional to the speed of motor 63. Such conveyor and the output of the differential transmission 67 are at the same speeds. Such action positively drives the carriage 8 at the same speed and in the same direction as the conveyor and the tread so that when the cross cut is made by the knife, the relative linear speed of the conveyor to the carriage 8 is zero. Upon completion of the cut, the limit switch LS–3 is actuated by cam 52 on the cross slide 38 which energizes solenoid valve SV–3B which pressureizes cylinder 28 to tilt the cross slide 38 and cutter disk 51 upwardly into the non-cutting position. Such tilting of the cross slide 38 actuates limit switch LS–2 on cam 53 which in turn conditions the circuit on conductor 169 for the next cutting cycle.

Further movement of the cross slide 38 transversely on the frame operates limit switch LS–4 which energizes solenoid operated valve SV–2B which in turn pressurizes pneumatic cylinder 45 which operates to return the cross slide 38 to its initial starting position. Such actuation of limit switch LS–4 also energizes control relay CR–7 which resets the digital measuring and control unit 134 to zero through closing of contact CR7–1, conductor 184 and the opening of contact CR7–2, conductor 185. In addition, the actuation of such control unit 134 resets the contacts of slow control relay SL–CR and contacts of stop control relay ST–CR in the manner described above for the next cycle. Such return movement of the cross slide 38 actuates LS–1 which pressurizes air cylinder 28 to tilt the cross slide 38 downwardly into position for its next cutting cycle.

Obviously many modifications and variations of the present invention are possible in the light of the above teachings. It is therefore understood, that within the scope of the appended claims, the invention may be practiced otherwise than as specifically described.

We claim:

1. An apparatus for cutting predetermined lengths of strip material comprising a support frame, an endless conveyor belt mounted on said frame having an upper run movable in a first linear direction, a carriage mounted on said frame and selectively movable in said first direction and a second direction which second direction is opposite to said first direction, a cross slide mounted on said carriage for transverse movement relative to said first direction, a cutter disc mounted on said cross slide for selective engagement with material on said endless conveyor for severing such material, a differential transmission means having a pair of input means and an output means, said output means operatively connected to said carriage for driving said carriage selectively in said first or second direction in accordance with the direction of rotation of said output means, first drive means operatively connected to said endless conveyor for driving said conveyor at a constant preselected speed, said first drive means operatively connected to one of said input means for driving said output of said transmission means, second drive means operatively connected to the other of said input means of said transmission means for modifying and determining the speed and direction of rotation of said output means, said second drive means having an output signal, and means responsive to said output signal operatively connected to said second drive means for rendering said second drive means inoperative whereby said carriage is driven through said transmission by said first drive means.

2. An apparatus for cutting predetermined lengths of strip material comprising a support frame, endless conveyor means having an upper run movable in a first direction, a carriage mounted on said frame movable in said first direction and a second direction opposite to the first direction, a cross slide mounted on said carriage for lateral movement thereon, a rotary cutter disc mounted on said cross slide selectively operable for engagement with such strip material on said endless conveyor for severing such material, transmission means having an output means operatively connected to said carriage for driving said carriage selectively in said first or second direction, first drive means having output means operatively connected to said endless conveyor means and said transmission means, said first drive means driving said endless conveyor and output of said transmission means to said carriage in the same direction and at the same linear speed, and second drive means operatively connected to said transmission means for selectively modifying said output from said transmission means during energization of said second drive means.

3. An apparatus as set forth in claim 2 wherein control means are operatively connected to said second drive means for controlling the output therefrom to said transmission means wherein said transmission means selectively moves said carriage in said first direction or said second direction in accordance with the speed of rotation of said second drive means.

4. An apparatus as set forth in claim 3 wherein said control means includes a feedback signal proportional to the speed of said first drive means for modifying the speed of rotation of said second drive means.

5. An apparatus for cutting strip material comprising a support frame; an endless conveyor mounted on said frame for supporting and moving strip material; a carriage mounted on said frame and movable relative to said conveyor; a cross slide movable transversely on said carriage; cutting means mounted on said cross slide; means for selectively tilting said cross slide into and out of cutting position; first motive means operatively connected to said carriage and said conveyor for driving said endless conveyor and said carriage at the same speed and in the same direction; second motive means operative during energization to modify the drive of said first motive means to said carriage; and control means operative to selectively energize said second motive means to thereby control the speed of rotation thereof to control the degree of modification of said second motive means on said first motive means to said carriage.

6. An apparatus for cutting predetermined lengths of strip material comprising a support frame, endless conveyor means mounted thereon, first drive means operative at a preselected constant speed of rotation to drive said conveyor for moving the upper run of said conveyor in a first linear direction at a first linear speed, a carriage mounted on said frame for selective reciprocable movement relative to said conveyor in said first direction and in a second direction opposite to said first direction, a cross slide mounted on said carriage for transverse movement thereon, cutting means mounted on said cross slide, differential transmission means having an output means operatively connected to said carriage for driving said carriage selectively in said first or said second direction, said first drive means operatively connected through said differential transmission means to provide an output for moving said carriage in said first linear direction at said first linear speed, a second drive means having a variable output speed connected to said transmission means for modifying said transmission output speed, and control means operatively connected to said second drive means for regulating said second drive means between a zero output and a maximum output which maximum output exceeds said output of said first drive means with a resulting output from said transmission to drive said carriage in said second direction.

7. An apparatus for cutting predetermined lengths of strip material comprising a support frame, an endless conveyor belt having an upper run movable in a first linear direction, a member mounted on said support frame movable in said first direction and a second direction which second direction is opposite to said first direction, cutting means mounted on said movable member operative to sever material supported by said endless conveyor belt, transmission means, a pair of input shafts operatively connected through said transmission means to an output shaft wherein said input shafts are effective to rotate said output shaft selectively in a clockwise direction or in a counterclockwise direction relative to the difference in speed of rotation of said input shafts, said output shaft operatively connected to said movable member to move said member selectively in said first or second directions, a control circuit including a first and second drive means, said first drive means operatively connected to said one input shaft and said endless conveyor belt for driving said one input shaft and said endless conveyor belt at a constant preselected speed, said second drive means operatively connected to the other of said input shafts, and said control circuit having means operatively connected to said second drive means to vary the speed thereof to selectively run said second drive means at a high speed wherein said movable member moves in said second direction at a high rate of speed, or run said second drive means at a low speed wherein said movable member moves in said first direction at a relatively slower speed than said endless conveyor belt, or stop the rotation of said second drive means wherein said upper run of said endless conveyor belt and said movable member run at the same linear speed.

8. In an apparatus for cutting predetermined lengths of stock by a computer controlled apparatus in accordance with a stored program comprising: a support frame, an endless conveyor belt mounted on said frame having an upper run movable in a first direction, a movable member having a cutter mounted thereon for cutting stock carried by said conveyor belt, transmission means coupled to said movable member for controlling the reciprocable movement thereof, a first input means having a preselected output operatively connected to said transmission means for moving said movable member in said first direction, variable speed second input means operatively connected to said transmission means to vary or nullify the effect of said first input means on said movable member, said second input means having a pulse generating means connected thereto generating pulses in response to rotation or portions of rotation thereof, a control unit storing a set of electrical control signals therein, a counting circuit coupled to said pulse generating means and responsive to said pulses for maintaining a count continuously representative of the rotations of said second input means, said control unit operative to produce an output signal when said count corresponds to said set of electrical control signals, and control means coupled to said second input means and responsive to said output signal for regulating the output of said second input means to said transmission means.

9. Apparatus for cutting predetermined lengths of strip material comprising a support frame, an endless conveyor belt having an upper run movable in a first linear direction, a member mounted on said support frame movable in said first direction and a second direction which second direction is opposite to said first direction, cutting means mounted on said movable member selectively operable to sever material supported by said endless conveyor belt, transmission means, a pair of input shafts operatively connected through said transmission means to an output shaft wherein said input shafts are effective to rotate said output shaft selectively in a clockwise direction or in a counterclockwise direction in accordance to the speed of rotation of said input shafts, said output shaft operatively connected to said movable member to move said member selectively in said first or second directions, first drive means operative at a preselected constant speed of rotation to drive said conveyor for moving the upper run of said conveyor in said first linear direction at a first speed, said first drive means operatively connected to one of said input shafts, said second drive means having a variable output speed operative upon energization to provide an output to the other of said input shafts, a control circuit selectively operable to energize said second drive means to provide a variable speed thereto including a high speed or a low speed to said other input shaft, said first drive means operative only during said high speed of said second drive means to provide a feedback signal proportional to said preselected constant speed to modify said output of said second drive means, and said control circuit being operable to de-energize said second drive means to render said first drive means, the sole drive means for said conveyor and said one shaft to said member through said transmission means.

10. An apparatus for cutting predetermined lengths of tread stock material comprising a support frame, an endless conveyor belt mounted on said frame having an upper run movable in a first linear direction, a carriage mounted on said frame and selectively movable in said first direction and second direction which is opposite to said first direction, cutting means movably mounted on said carriage operative to sever material supported by said endless conveyor belt, transmission means, a pair of input means operatively connected through said transmission means to an output shaft wherein said input means are effective to rotate said output shaft selectively in a clockwise direction or a counterclockwise direction in accordance with the difference in speed of rotation of said input means, said output shaft operatively connected to said carriage to move said carriage in said first or second directions, first drive means operatively connected to said endless conveyor belt for driving said conveyor at a constant preselected speed, said first drive means operatively connected to one of said input means to drive said output shaft of said transmission means, a second drive means operatively connected to the other of said input means of said transmission means for modifying the speed of rotation of said output means, said second drive means having a control field winding, circuit control means having a first and a second return circuit operatively connected to said control field winding to selectively control the speed of rotation of said second drive means, said first return circuit operative upon energization to provide a high speed to said second drive means wherein said second drive means rotates said other input means at a speed greater than said first drive means rotates said one input means thereby said second drive means predominates and determines the speed of rotation and direction of movement of said carriage.

11. In an apparatus for cutting predetermined lengths of continuously moving material in accordance with a stored program comprising: a first endless conveyor member having an upper run movable in a first direction; a second member movable in said first direction and a second direction opposite to said first direction; cutting means mounted on said second member operative on actuation to cut material conveyed by said first member; means for actuating said cutting means; position control means having a first drive means and a second drive means; an output shaft; transmission means operatively connecting said first and second drive means to said output shaft; said output shaft connected to said second member for controlling the direction of movement thereof; said first drive means operatively connected to said first member to drive said first member at a given speed, a motion detector means responsive to rotation of said second drive means for generating electrical pulses operable to convert a desired stored program into corresponding sets of electrical control signals; a counting circuit coupled to said motion detector and responsive to said electrical pulses for maintaining a count of the number of revolutions of said second drive means; comparison means coupled to said counting circuit for producing output signals when said count corresponds to said set of electrical control sgnals, and control means responsive to said output signals for selective control of said second drive means.

12. In an apparatus as set forth in claim 11 wherein said comparison means is operable for successively producing a first and second set of electrical output signals when said count corresponds to said set of electrical control signals; said control means responsive to said first set of electrical output signals to drive said second drive means at a slow speed relative to said first drive means whereby said second member moves in said first direction at a speed slightly less than said given speed of said first member and responsive to said second set of electrical output signals to render said second drive means stationary whereby said first and second members are driven at the same rate of speed and in the same direction.

13. In an apparatus as set forth in claim 12 wherein said control means drives said second drive means at a high speed relative to said first drive means prior to actuation by said output signals whereby said second member moves in said second direction at a high rate of speed.

14. In an apparatus as set forth in claim 13 wherein a rotary transformer is operable upon predetermined movement of said second member in said second direction to match the speed of said second drive means to the speed of said first drive means.

15. An apparatus for cutting predetermined lengths of strip material comprising a support frame; an endless conveyor belt having an upper run movable in a first linear direction; a carriage mounted on said frame selectively movable in said first direction and a second direction which second direction is opposite to said first direction; a cross slide mounted on said carriage for transverse movement relative to said first direction; a cutter disc mounted on said cross slide for selective engagement with tread stock on said conveyor belt for serving such tread stock; a differential transmission having a first and second input means and an output means; said output means operatively connected to said carriage for driving said carriage selectively in said first direction or said second direction in accordance with the speed of rotation of said first and second input means, a first motor operatively connected to drive said conveyor belt and said first input means; a second motor operatively connected to drive said second input means; a generator having an output to said second motor to control the speed of rotation of said second motor; an amplifier having an output operatively connected to said generator to control the output thereof; a control circuit operable upon actuation to selectively provide a first reference voltage and a second reference voltage for said amplifier; said first motor having an output signal during operation of said first reference voltage proportional to the speed of said first motor to provide a voltage for said amplifier in a direction to raise said first reference voltage to said amplifier output; said second motor having an output signal proportional to the speed of said second motor to provide a voltage for said amplifier in a direction to lower said first reference voltage to said amplifier output; said second motor having means for generating electrical pulses proportional to the number of rotations or portions of rotations of said second motor; counting and comparison circuit means coupled to said pulse generating means and operable for successively producing a first impulse and a second impulse, a control circuit connected to said comparison circuit and responsive to said first impulse for slowing down the output of said amplifier to said generator whereby said second motor slows down; and said control circuit connected to said comparison circuit and responsive to said second impulse for stopping said amplifier output to said generator whereby said second motor stops to thereby synchronize the linear movement of said carriage w.th said conveyor belt by independent positive drive means.

16. An apparatus for cutting strip material comprising a support frame having a conveyor for supporting and moving strip material in a longitudinal direction, a carriage mounted on said frame for reciprocable movement in said longitudinal direction thereon, a cross slide movable transversely of said carriage, means for supporting a cu.ter in an inclined position on said cross slide, means for advancing said cutter into cutting position with the strip material, transmission means having an output shaft opera.ive to drive said carriage, a first motor connected to said conveyor for driving said conveyor at a constant preset speed, said first motor having an input to said transmission means, a second motor with an output operatively connected to said transmission to modify said input of said first motor whereby said output shaft selectively drives said carriage in the same or opposite direction as said longitudinal direction, a generator having an output that controls the speed of said second motor, an amplifier operatively connected to said generator having an output that controls said generator output, a control circuit operative upon actuation to selectively provide a high reference voltage or a low reference voltage to said amplifier, switch means for actuating said control circuit to provide said high reference voltage causing said carriage to move in said second direction at a high rate of speed, said control circuit operative during the supplying of said high reference voltage to provide a first output signal voltage proportional to the speed of said first motor to raise said high reference voltage to a modified reference voltage to said amplifier, said second motor having a second output signal that provides a voltage in opposition to said first output signal, said second motor having a pulse generating means connected thereto generating pulses in response to rotation or portions of rotation thereof, a program unit selectively operable to convert a desired program into corresponding sets of electrical control signals; a counting circuit coupled to said pulse generating means for registering a count of the number of revolutions of said second drive means; said counting circuit producing a successive first and second set of electrical output signals when said count corresponds to said set of electrical control signals; control means responsive to said first set of output signals to cut out said high reference voltage and substitute said low reference voltage to thereby lower said amplifier output which correspondingly lowers said generator output to said second motor; and said control means responsive to said second set of output signals to interrupt said amplifier output to stop said second motor and thereby drive said first and second members at the same speed and in the same direction.

17. An apparatus for cutting predetermined lengths of strip material comprising a support frame, an endless conveyor belt having an upper run movable in a first linear direction, a carriage mounted on said support frame movable in said first direction and a second direction which second direction is opposite to said first direction, cutting means mounted on said carriage operative to sever material supported by said endless conveyor belt, a pair of input shafts, differential transmission means having said pair of input shafts operatively connected therethrough to an output shaft wherein said input shafts are effective to rotate said output shafts selectively in a clockwise direction or a counterclockwise direction in accordance with the difference in speed of rotation of said input shafts, said output shaft operatively connected to said carriage to move said carriage in said first or second directions, a first drive means operatively connected to said endless belt for driving said belt at a preselected speed, said first drive means operatively connected to one of said input shafts to drive said output shaft and said carriage in said first direction, a second drive means operatively connected to the other of said input shafts for modifying the speed of rotation of said output shaft, a control field winding operative to govern the speed of rotation of said second drive means, a control circuit selectively operable upon actuation to provide a high reference voltage or a low reference voltage to said control field winding, said control circuit operative during actuation of said high reference voltage to provide a first signal voltage proportional to the preset speed of said first drive means and being additive to said high reference voltage to provide a modified high reference voltage to said control field which drives said second drive means and said carriage in said second direction at a high speed relative to said first linear speed, means responsive to a predetermined movement of said carriage in said second direction to further modify said modified high reference voltage to provide a voltage to said control field that drives said second drive means at a speed equal to the speed of said first drive means whereby said carriage is stationary, means for selectively actuating said control circuit, said control circuit operative during actuation of said low reference voltage to provide said low reference voltage to said control field to drive said second drive means in said first direction at a speed incrementally less than said conveyor belt, and means for deactuating said control circuit to render said second drive means inoperative to thereby drive said conveyor belt and carriage by said first drive means at the same speed and in said first direction.

18. An apparatus as set forth in claim 17 wherein brake means are operative to stop rotation of said other input shaft in response to deactuation of said control circuit.

References Cited
UNITED STATES PATENTS

| | | | |
|---|---|---|---|
| 2,079,974 | 5/1937 | Traut | 83—318 X |
| 2,550,191 | 4/1951 | Godat | 83—320 X |
| 3,071,999 | 1/1963 | Thorn | 83—311 X |

ANDREW R. JUHASZ, *Primary Examiner.*